(12) United States Patent
Duclos et al.

(10) Patent No.: US 7,192,566 B2
(45) Date of Patent: Mar. 20, 2007

(54) PROCESS FOR THE CATALYTIC DECOMPOSITION OF $N_2O$ TO $N_2$ AND $O_2$ CARRIED OUT AT HIGH TEMPERATURE

(76) Inventors: Delphine Duclos, 1, Place des Genets, 56520, Guidel (FR); Christian Hamon, 41, Chemin de Porce, 44600 St. Nazaire (FR)

(*) Notice: Subject to any disclaimer, the term of this patent is extended or adjusted under 35 U.S.C. 154(b) by 215 days.

(21) Appl. No.: 10/724,361

(22) Filed: Dec. 1, 2003

(65) Prior Publication Data

US 2004/0228785 A1  Nov. 18, 2004

(30) Foreign Application Priority Data

Dec. 2, 2002  (FR) ................... 02 15135

(51) Int. Cl.
 C01B 21/02 (2006.01)
 C01B 21/38 (2006.01)
(52) U.S. Cl. ............ 423/351; 423/392; 423/403; 423/404; 423/579
(58) Field of Classification Search ........... 423/403, 423/404, 351, 392, 579
 See application file for complete search history.

(56) References Cited

U.S. PATENT DOCUMENTS

| | | | | |
|---|---|---|---|---|
| 3,907,714 A | * | 9/1975 | Compton et al. | 502/304 |
| 4,018,710 A | * | 4/1977 | Oshimura et al. | 502/223 |
| 4,036,935 A | * | 7/1977 | Ray et al. | 423/404 |
| 4,085,193 A | * | 4/1978 | Nakajima et al. | 423/239.1 |
| 5,478,549 A | * | 12/1995 | Koch | 423/403 |
| 5,656,567 A | * | 8/1997 | Heywood | 502/339 |
| 5,690,900 A | * | 11/1997 | Smojver | 423/392 |
| 6,743,404 B1 | * | 6/2004 | Schumacher et al. | 423/239.1 |

FOREIGN PATENT DOCUMENTS

| | | |
|---|---|---|
| FR | 2587388 | 1/1987 |
| FR | 2699524 | 6/1994 |
| FR | 2701471 | 8/1994 |
| FR | 2748740 | 11/1997 |
| WO | WO 99/55661 | 11/1999 |
| WO | WO 01/58570 | 8/2001 |
| WO | WO 02/22230 | 3/2002 |

* cited by examiner

Primary Examiner—Wayne A. Langel

(57) ABSTRACT

The invention relates to a process for the catalytic decomposition of $N_2O$ to $N_2$ and $O_2$.

This process is carried out at a high temperature, generally of between 700 and 1000° C., at a high HSV and in the presence of a catalyst composed of a mixed oxide of zirconium and of cerium existing in the form of a solid solution.

7 Claims, 4 Drawing Sheets

PROCESS FOR THE CATALYTIC DECOMPOSITION OF $N_2O$ TO $N_2$ AND $O_2$ CARRIED OUT AT HIGH TEMPERATURE

A subject matter of the invention is a process for the decomposition of $N_2O$ to $N_2$ and O2 carried out at high temperature and implemented in the presence of a catalyst composed of a mixed oxide of zirconium and of cerium.

Global warming is today a widely accepted phenomenon with the greenhouse effect as the main cause, this effect being brought about by the increase in the atmosphere of the content of $CO_2$ related to the constantly increasing combustion of fossil fuels.

Apart from $CO_2$ emissions, other gases emitted in much smaller amounts also participate, because of their high global warming potential, in this greenhouse effect. They are in particular methane ($CH_4$) and nitrous oxide ($N_2O$), the global warming potentials of which, with respect to that of $CO_2$, are 60 and 310 respectively. It is therefore desirable to reduce the emissions generated by industrial development. A significant part of this nitrous oxide of industrial origin originates from the manufacture of nitric acid by oxidation of ammonia (nitric acid plant).

In a nitric acid plant, ammonia ($NH_3$) is oxidized to NO by air with catalysts composed of platinum gauzes. The reaction is carried out under a pressure of a few bar which can vary according to the type of plant. This reaction is highly exothermic and the temperature level after passing over the gauzes is very high. For a temperature of the air/$NH_3$ mixture at the inlet of the reactor of approximately 200° C., it lies, at the outlet of the reactor, at a temperature generally of between 800 and 900° C.

During the oxidation to NO, small amounts of nitrous oxide $N_2O$ are also formed. The gaseous effluent coming from the reactor then comprises NO, $N_2$, $H_2O$ and residual $O_2$, along with small amounts of $N_2O$. The energy present in the gases is recovered during the cooling by boilers with production of steam. The NO, which has become an $NO/NO_2$ mixture in equilibrium, with $NO_2$ predominant, is subsequently converted to nitric acid by absorption in water in a pressurized column according to well known mechanisms resulting in the presence, in the gaseous effluent at the column outlet, of the various nitrogen oxides NO, $NO_2$, generally referred to as $NO_x$, and $N_2O$. The $NO_x$ content depends on the size of the column and thus on its efficiency.

In a subsequent stage, said effluent is treated in order to remove the $NO_x$, generally by catalytic reduction by $NH_3$. This stage is well known and widely applied to date to tail gases from nitric acid plants before the expansion turbine. The temperature of these gases is generally between 200 and 250° C.

$N_2O$ has very little solubility in water and is therefore virtually entirely present at the outlet of the column in what is referred to as the tail gases. To remove the $N_2O$, the $N_2O$ can be treated with a specific catalyst with regard to these tail gases. This forms, for example, the subject matter of the French patent filed on Dec. 31, 1997 on behalf of the Applicants and published under No. 2 773 144, employing a catalyst based on zeolite of iron-exchange ferrierite type. However, this catalyst is active only from approximately 400° C., which necessitates reheating the gases and thus results in significant capital costs and significant energy consumptions.

It is known that the $N_2O$ is formed in the first stage of the process over the platinum gauzes. One solution, a priori economic, consists in treating the $N_2O$ directly in the burner, thus in the absence of reducing compounds, at the outlet of the platinum gauzes by installing a suitable specific catalyst, which avoids expensive equipment and does not result in a significant additional energy cost.

Recent studies have been carried out on this subject and have formed the subject matter of patents. Mention may in particular be made of the use of mixed oxides based on cobalt and on magnesium (international application WO 01/58570 on behalf of Krupp Uhde), the use of Cu, Zn, Al spinels (international application WO 99/55661 on behalf of BASF) or catalysts based on zirconia (U.S. Pat. No. 5,478,549 on behalf of DuPont). Finally, the use of mixed oxides based on cobalt and iron on a ceria ($CeO_2$) support optionally doped with zirconia ($ZrO_2$) is noted (international application WO 02/022230 on behalf of Norsk Hydro).

A suitable catalyst for the process must therefore be active for the decomposition of the $N_2O$ to $N_2$ and $O_2$. In processes of this type for the synthesis of nitric acid, the volume available in the burner after the platinum gauzes is reduced, which implies having to operate at high hourly space velocities (HSVs). Generally, this HSV is greater than 30 000 $h^{-1}$ and preferably between 50 000 and 80 000 $h^{-1}$. Consequently, the catalyst has to make it possible to operate at these high space velocities. Furthermore, and this is an essential problem, this catalyst has to be stable over time despite the high temperature level.

There exist numerous oxides, for example MgO and CaO, which make it possible to decompose $N_2O$ with good efficiency, that is to say a high yield, for an HSV of the order of 10 000 $h^{-1}$. These types of oxides do not, however, meet the criteria which are set, namely a very good activity at HSVs of the order of 50 000 $h^{-1}$, indeed even more.

The catalysts, such as, for example, zirconia, capable of being effective at the temperature conditions and HSV conditions envisaged exhibit the disadvantage, however, of not being stable over time. The fall in activity is probably due to textural and/or structural modifications.

To solve this problem, it is essential to succeed in retaining the structure and the texture of the oxides constituting the catalyst, which is reflected in particular by the retention of a high specific surface.

Figure 1:
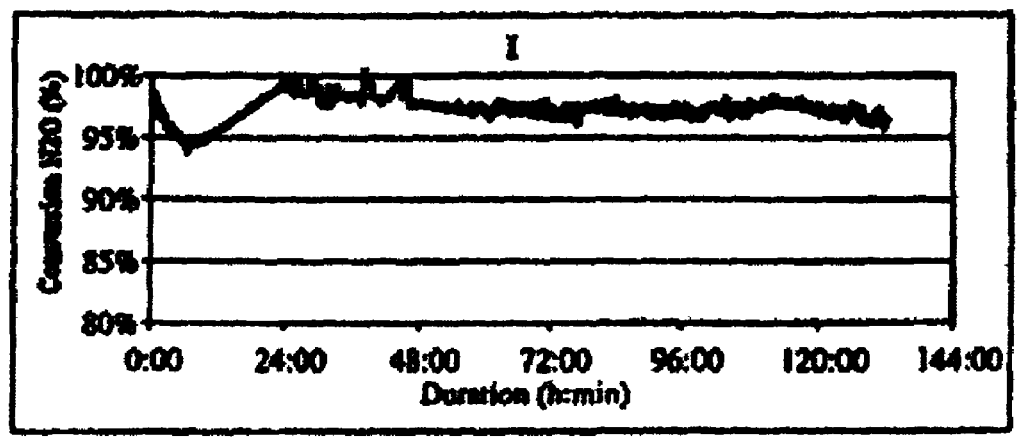
FIG. 1 shows conversion of $N_2O$ for $CeO_2$ (21.2%)/$ZrO_2$ (78.8%)
Figure 2:
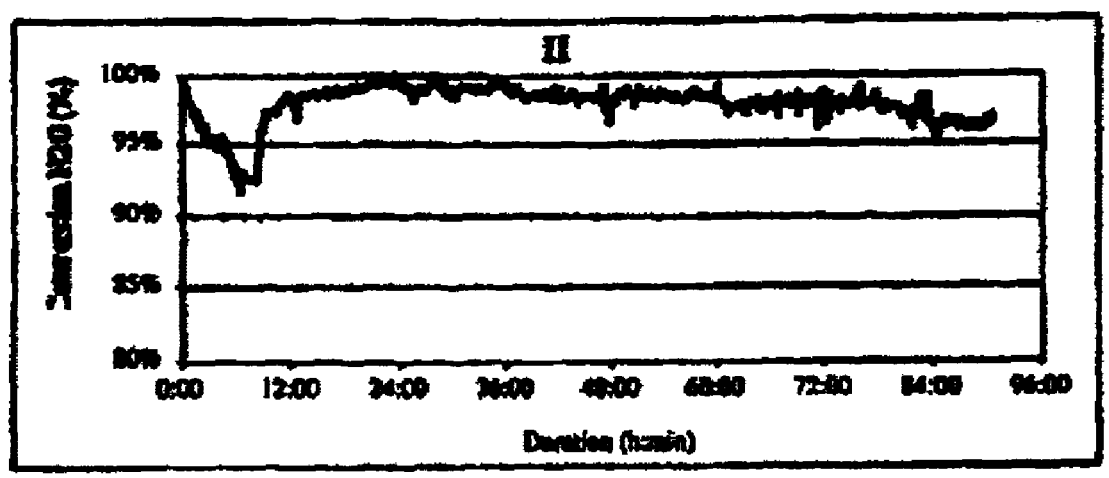
FIG. 2 shows conversion of $N_2O$ for $CeO_2$ (48.9%)/$ZrO_2$ (51.1%)
Figure 3:
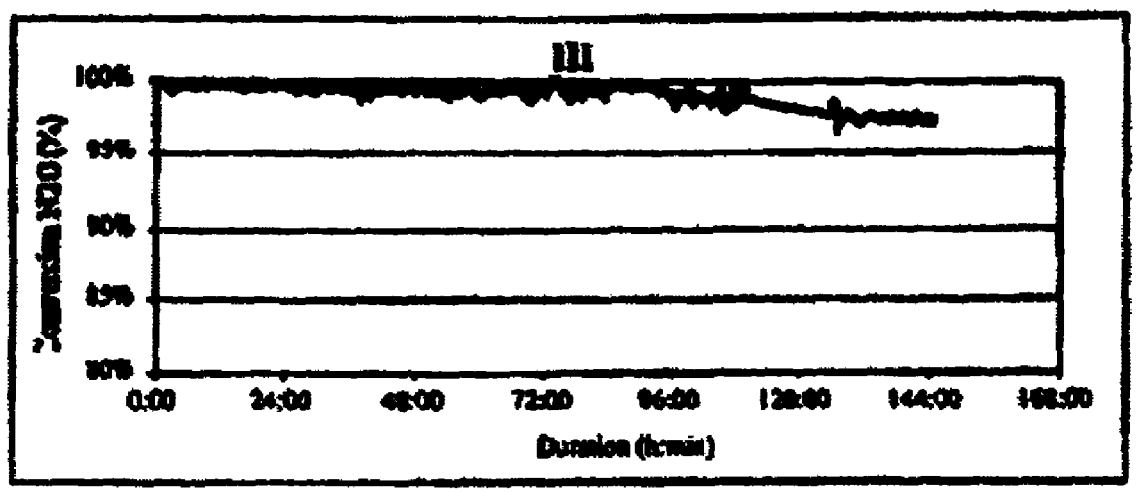
FIG. 3 shows conversion of $N_2O$ for $CeO_2$ (60.4%)/$ZrO_2$ (36.4%)/$Y_2O_3$ (3.2%)
Figure 4:
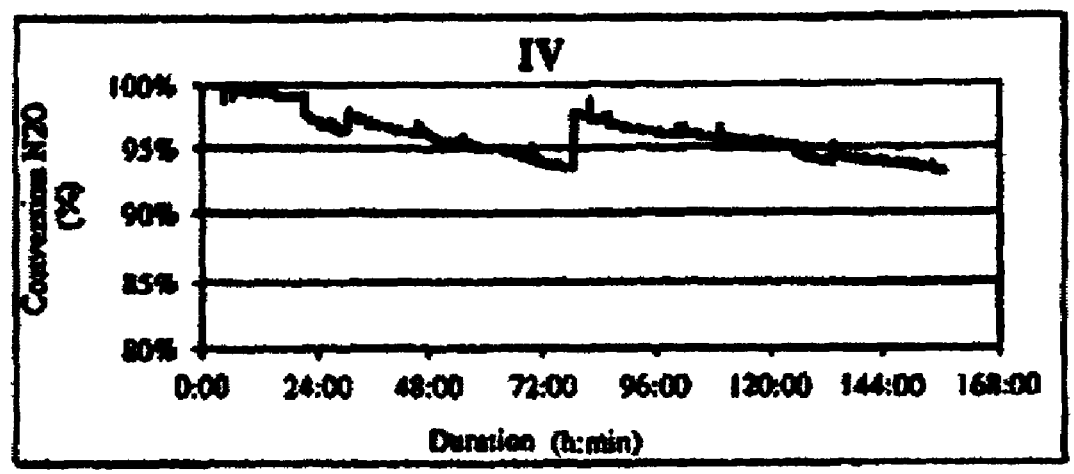
FIG. 4 shows conversion of $N_2O$ for $CeO_2$ (70.2%)/$ZrO_2$ (28.8%)

The present invention relates to catalysts based on oxides of zirconium (Zr) and of cerium (Ce) in the form of a solid solution.

This constitutes the subject matter of the present invention.

The present invention is targeted at a process for the decomposition of $N_2O$ to $N_2$ and $O_2$ carried out at a temperature of between 700 and 1 000° C. which is implemented in the presence of a catalyst composed of a mixed oxide of zirconium and of cerium existing in the form of a solid solution.

The term "solid solution" is understood to mean a mixed oxide of two elements, in this instance cerium and zirconium, in which one of the elements is inserted in the crystal structure of the other oxide in substitution for the other element, while retaining the structure of this oxide. This is reflected by identical X-ray diffraction spectra, the only minor modifications, due to the different size of the Zr and Ce atoms, being the unit cell parameters and the intensity of some diffraction lines.

These solid solutions can be prepared according to the processes disclosed in the French patents published under the following numbers: 2 584 388, 2 699 524, 2 701 471 and 2 748 740, on behalf of Rhône-Poulenc Chimie.

These documents, in particular patents 2 701 471 and 2 748 740, mention the use of such solid solutions in the catalysis of various reactions. It concerns in particular the oxidation/reduction treatment of exhaust gases from internal combustion engines, which comprise various compounds, such as incinerated hydrocarbons (HC), CO and $NO_x$, $NO_x$ denoting the $NO/NO_2$ pair of nitrogen oxides in equilibrium according to the thermodynamic conditions of the system and which are very different from nitrous oxide $N_2O$, whether in behavior or in the effect with regard to pollution.

The catalysts of the invention will exhibit an effective specific surface of greater than 25 $m^2/g$. The specific surface will be as high as possible and preferably greater than 30 $m^2/g$. The term "effective specific surface" is understood to mean the specific surface of the catalyst under stationary conditions, that is to say after operating for 100 h in the reaction medium. This surface is substantially different from that of the fresh catalyst. The specific surfaces of the fresh catalyst will generally be between 60 and 150 $m^2/g$. In the process of the invention, the "effective" specific surface is related to the size of the grains and not to their intrinsic porosity. The particles generally have a tendency to agglomerate by a sintering phenomenon when the temperature level is high for long periods. This results in a decrease in the specific surface. In the process of the invention, the phenomenon is limited and controlled.

It is not possible, to evaluate these catalysts and to test their effectiveness in the decomposition of $N_2O$, to carry out these procedures on powder because of the pressure drop which it brings about. This thus requires a preforming, for example by pelleting. In the present case, for the tests carried out on the laboratory scale, pellets with a diameter of 5 mm are prepared from the powder and are subsequently crushed and then sieved between 0.5 and 1 mm.

The catalysts of the invention are based on zirconium oxide ($ZrO_2$) and on cerium oxide ($CeO_2$) in the form of solid solutions of these two oxides. The ratios of the respective contents by weight of $ZrO_2$ and $CeO_2$ in the solid solutions will generally be between 80/20 and 20/80 and preferably between 70/30 and 30/70. In the case where one of the oxides is predominant and where the content of the minor element is below the solubility threshold, only one solid solution is present. In the case where the $ZrO_2/CeO_2$ ratio by weight is close to 1, two solid solutions will be present.

The catalysts of the invention can comprise other metals, such as yttrium, at low contents of the order of a few %, which will confer certain additional properties thereon, such as the thermal stability, with better retention of the structure and texture.

EXAMPLES 1 to 4

Examples 1 to 4 below illustrate the use of these solid catalysts in the decomposition of $N_2O$ through experiments carried out on the laboratory scale on a reconstituted gas having a composition similar to that encountered after the platinum gauzes in the process in nitric acid plants.

The tests are carried out in a traversable stationary bed reactor with a diameter of 1". The reactor, made of heat-resisting steel, is surrounded by heating shells regulated by PID.

The reaction mixture is prepared from dry air, from nitrogen and from $N_2O/N_2$ and $NO/N_2$ bottles.

The content of water vapor is adjusted by a stainless steel air humidifier in temperature (60° C.) in order to observe the high water content in the gas after the platinum gauzes, i.e. approximately 15% of the volume.

The flow rates are adjusted by mass flowmeters.

The standard composition of the reaction mixture is as follows:

| | |
|---|---|
| $N_2O$: | 1 000 ppm |
| NO: | 1 400 ppm |
| $O_2$: | 3% |
| $H_2O$: | 15% |
| $N_2$: | up to 100% |

The NO content does not correspond to that which is observed in the process in nitric acid plants after passing over the platinum gauzes and which is approximately 12% of the volume. It has been set at this level for safety reasons. However, it has been increased up to 5 000 ppm without a modification being observed in the results obtained, which shows that the process of the invention does not depend on the NO content of the mixture to be treated.

The catalysts were supplied by Rhodia in the powder form with various $ZrO_2/CeO_2$ ratios, one of them additionally comprising yttrium.

It is not possible to carry out the procedure with powder because of the pressure drop. This thus requires a preforming (pellets with a diameter of 5 mm). The pellets are subsequently crushed and then sieved to have granules with a dimension of between 0.5 and 1 mm.

Their compositions are shown below, along with their specific surfaces. The contents shown are those as oxides $CeO_2$, $ZrO_2$ and $Y_2O_3$ in weight %, the sum of these percentages naturally being equal to 100. The specific surfaces in $m^2/g$, measured according to the BET method, for the fresh catalysts also appear, along with the effective specific surfaces.

| No. | $CeO_2$ %* | $ZrO_2$ %* | $Y_2O_3$ %* | Specific Surface** BET fresh catalyst | Specific Surface effective** |
|---|---|---|---|---|---|
| I | 21.2 | 78.8 | | 72 | 30*** |
| II | 48.9 | 51.1 | | 74 | 29 |
| III | 60.4 | 36.4 | 3.2 | 123 | 37 |
| IV | 70.2 | 29.8 | | 135 | 26 |

*expressed by weight
**in $m^2/g$
***measured after 24 h

The catalysts are employed in the form of granules with a size of 0.5 to 1 mm. The volume of catalyst employed is 5 $cm^3$, i.e. a height of 10 mm.

The tests were carried out at an HSV of 50 000 $h^{-1}$, i.e. a total flow rate of the inlet gas of 250 Sl/h. Moreover, the temperature was set at 850° C.

The level of conversion of the $N_2O$ as a function of the time for the four catalysts appears below.

The analyses of the N$_2$O content at the reactor outlet are carried out by infrared.

EXAMPLE 5

This example illustrates the use of catalysts according to the invention in a process for the synthesis of nitric acid by oxidation of ammonia with air carried out in a pilot-scale reactor with an effective diameter of less than 100 mm.

The operating conditions are as follows:
a catalytic bed with a height of 50 mm composed of the catalyst referenced III above is placed in a basket suited to the temperature conditions positioned under the platinum gauzes composed of wires of a platinum/rhodium alloy comprising 5% of rhodium with a diameter of 0.060 mm, the operating conditions of the reactor are as follows:
Concentration of ammonia in the air/ammonia mixture: 10.6% by volume Temperature of the air/ammonia mixture: 165° C. Temperature of the platinum gauzes: 870° C. Operating pressure: 5 bar absolute, i.e. 500 kpascals Charge of the reactor: HSV of 80 000 h$^{-1}$.

To measure the degree of removal (or scrubbing) of the N$_2$O, the amount of N$_2$O produced under the same operating conditions but in the absence of the catalytic bed is first of all measured. The amount of N$_2$O produced under these conditions is 1 400 ppm.

The amount of N$_2$O produced in the presence of the catalytic bed is measured and is 200 ppm, i.e. a degree of removal of 85%.

The yield for the oxidation of ammonia in the presence or absence of the catalyst is 96.2%, which shows that the catalyst has no destructive effect on the NO produced over the platinum gauzes.

What is claimed is:

1. A process for the decomposition of N$_2$O to N$_2$ and O$_2$ comprising: decomposing N$_2$O to N$_2$ and O$_2$ at a temperature of between 700 and 1 000° C. and at a HSV of more than 50,000 h$^{-1}$ in the presence of a catalyst that comprises a mixed oxide of zirconium and of cerium predominantly existing in the form of a solid solution.

2. The process as claimed in claim 1, wherein the catalyst exhibits an effective specific surface of greater than 25 m$^2$/g.

3. The process as claimed in claim 1, wherein the ZrO$_2$/CeO$_2$ ratio by weight in the catalyst is between 80/20 and 20/80.

4. The process as claimed in claim 1, wherein the catalyst also comprises yttrium.

5. The process as claimed in one of claims 1 to 4, wherein the catalyst has a specific surface of between 60 and 150 m$^2$/g when fresh.

6. The process as claimed in claim 1, wherein the ZrO$_2$/CeO$_2$ ratio by weight in the catalyst is between 70/30 and 30/70.

7. A process for the decomposition to N$_2$ and O$_2$ of N$_2$O present in the effluent from a unit for the production of nitric acid, comprising: decomposing N$_2$O to N$_2$ and O$_2$ with a catalyst that comprises a mixed oxide of zirconium and of cerium in the form of a solid solution that is positioned under at least one platinum gauze of the reactor for the oxidation of ammonia, wherein the decomposition is carried out at a temperature of between 700° C. and 1000° C. and at a HSV of more than 50,000 h$^{-1}$.

* * * * *